US012707241B2

(12) United States Patent
Kim et al.

(10) Patent No.: US 12,707,241 B2
(45) Date of Patent: Aug. 11, 2026

(54) METHODS FOR USER DEVICE CENTRIC ORCHESTRATION, ORCHESTRATION CLUSTER (RE)FORMATION AND COMPUTE-AS-A-SERVICE MECHANISM

(71) Applicant: MEDIATEK INC., Hsinchu (TW)

(72) Inventors: Bong Ho Kim, San Jose, CA (US); Doru Calin, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 200 days.

(21) Appl. No.: 18/616,484

(22) Filed: Mar. 26, 2024

(65) Prior Publication Data

US 2024/0340620 A1 Oct. 10, 2024

Related U.S. Application Data

(60) Provisional application No. 63/495,128, filed on Apr. 10, 2023.

(51) Int. Cl.
*H04W 4/50* (2018.01)
*H04W 12/06* (2021.01)

(52) U.S. Cl.
CPC ............. *H04W 4/50* (2018.02); *H04W 12/06* (2013.01)

(58) Field of Classification Search
CPC ................................ H04W 4/50; H04W 12/06
See application file for complete search history.

(56) References Cited

U.S. PATENT DOCUMENTS

2020/0007456 A1* 1/2020 Greenstein .......... G06F 9/45558
2022/0156102 A1* 5/2022 Bandarupalli ........ G06F 9/5077
2022/0357958 A1* 11/2022 Deokule ................. H04L 67/10
2023/0161631 A1* 5/2023 Sharma ................. G06F 9/5044
718/104
2023/0401585 A1* 12/2023 Knight ................ G06F 11/3062
2024/0397315 A1* 11/2024 Ogbuachi ........... H04L 63/0272

* cited by examiner

*Primary Examiner* — Jonathan A Bui
(74) *Attorney, Agent, or Firm* — troutman pepper locke; Tim Tingkang Xia, Esq.

(57) ABSTRACT

In an aspect of the disclosure, a method, a computer-readable medium, and an apparatus are provided. The method may be performed by a device. In certain configurations, the device autonomously manages, by a device compute orchestrator (DCO), orchestration of compute resources and network connectivity resources in a network. The device is capable of creating a first cluster for an application executed on the user device and functioning as a master node and a worker node in the first cluster, and joining a second cluster for another application executed on another user device and functioning as a worker node in the second cluster for sharing compute resources and network connectivity resources of the device in the second cluster.

29 Claims, 15 Drawing Sheets

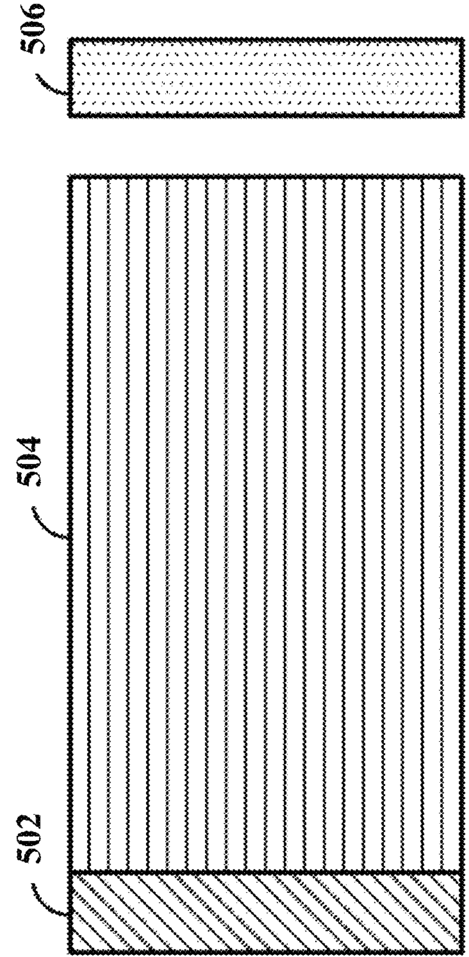
FIG. 5
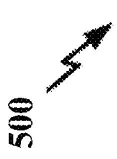
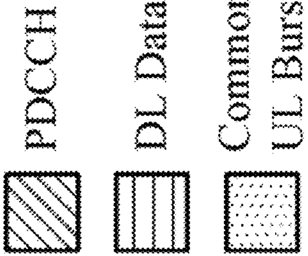

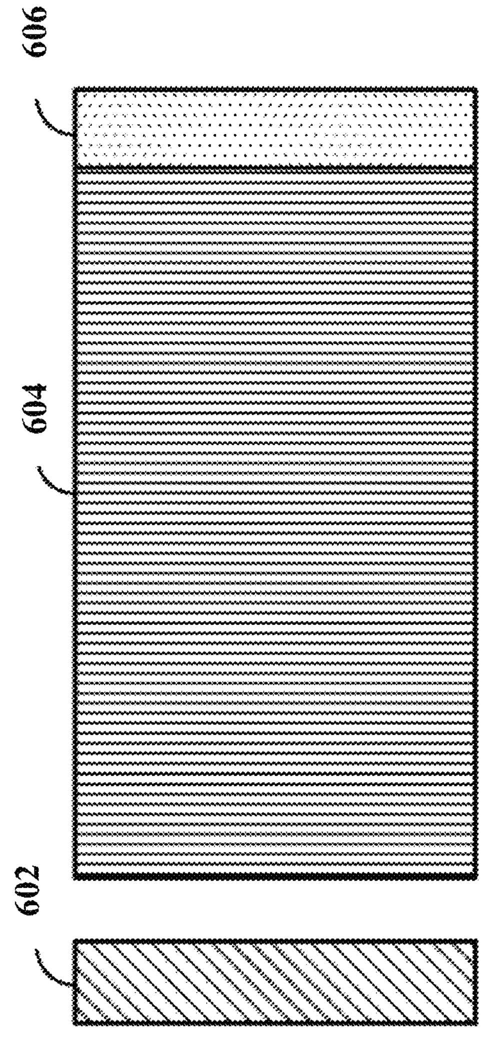
FIG. 6
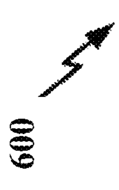
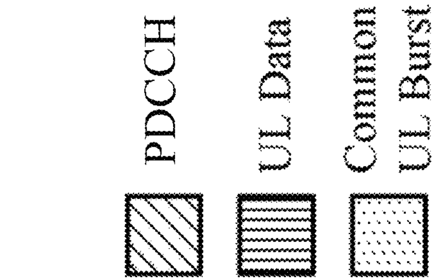

METHODS FOR USER DEVICE CENTRIC ORCHESTRATION, ORCHESTRATION CLUSTER (RE)FORMATION AND COMPUTE-AS-A-SERVICE MECHANISM

CROSS-REFERENCE TO RELATED APPLICATION(S)

This application claims the benefits of U.S. Provisional Application Ser. No. 63/495,128, entitled "Methods for user device centric orchestration, orchestration cluster (re) formation and Compute-as-a-Service mechanism" and filed on Apr. 10, 2023, which is expressly incorporated by reference herein in their entirety.

BACKGROUND

Field

The present disclosure relates generally to communication systems, and more particularly, to techniques of methods for user device centric orchestration, orchestration cluster (re) formation and Compute-as-a-Service mechanism.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The method may be performed by a device. In certain configurations, the device autonomously manages, by a device compute orchestrator (DCO), orchestration of compute resources and network connectivity resources in a network. The device is capable of creating a first cluster for an application executed on the user device and functioning as a master node and a worker node in the first cluster, and joining a second cluster for another application executed on another user device and functioning as a worker node in the second cluster for sharing compute resources and network connectivity resources of the device in the second cluster.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a diagram showing an example of a DL-centric slot.

FIG. 6 is a diagram showing an example of an UL-centric slot.

DETAILED DESCRIPTION

Figure 1:
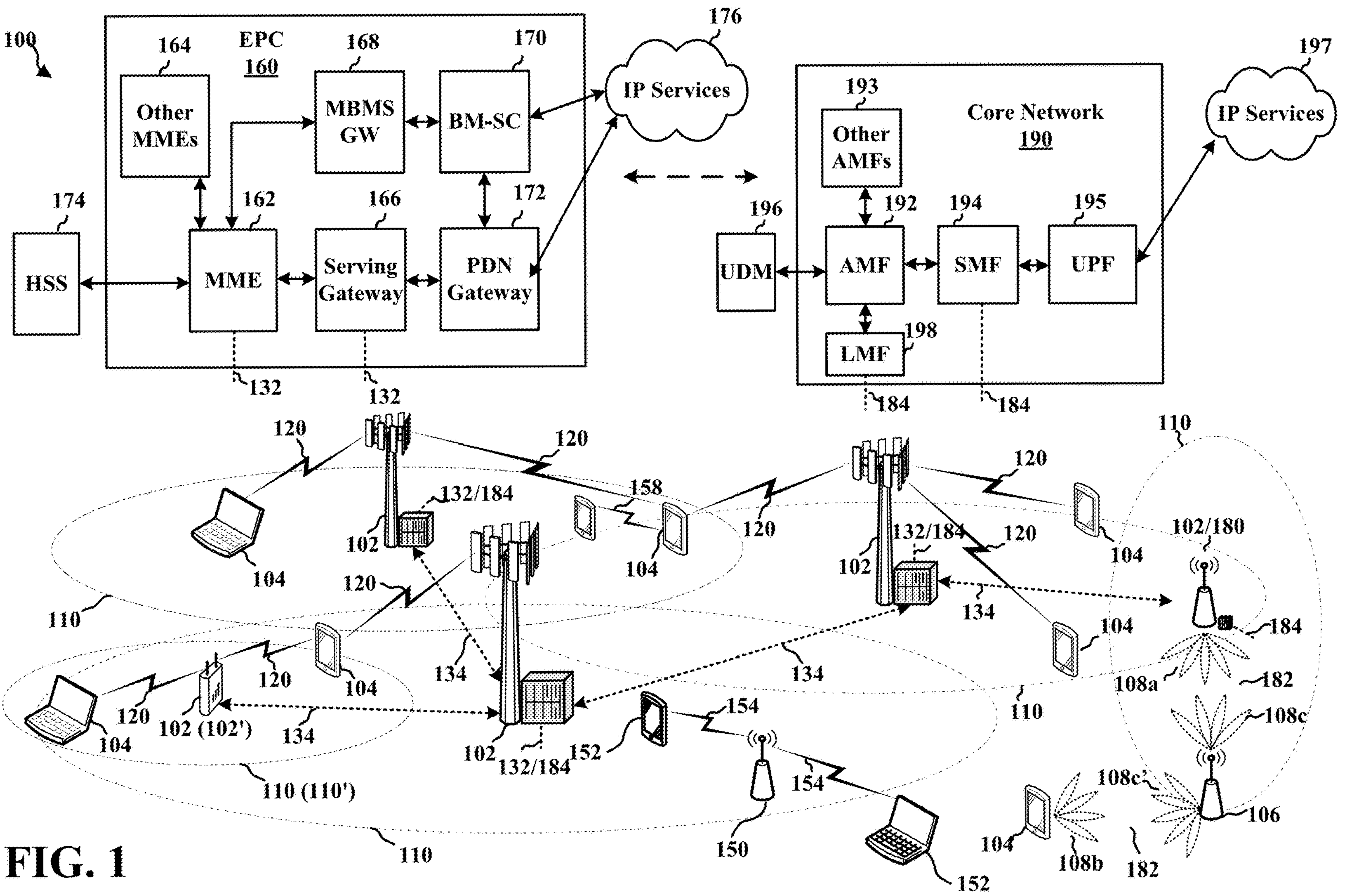
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHZ (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHZ-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108*a*. The UE 104 may receive the beamformed signal from the base station 180 in one or more receive directions 108*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (CNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
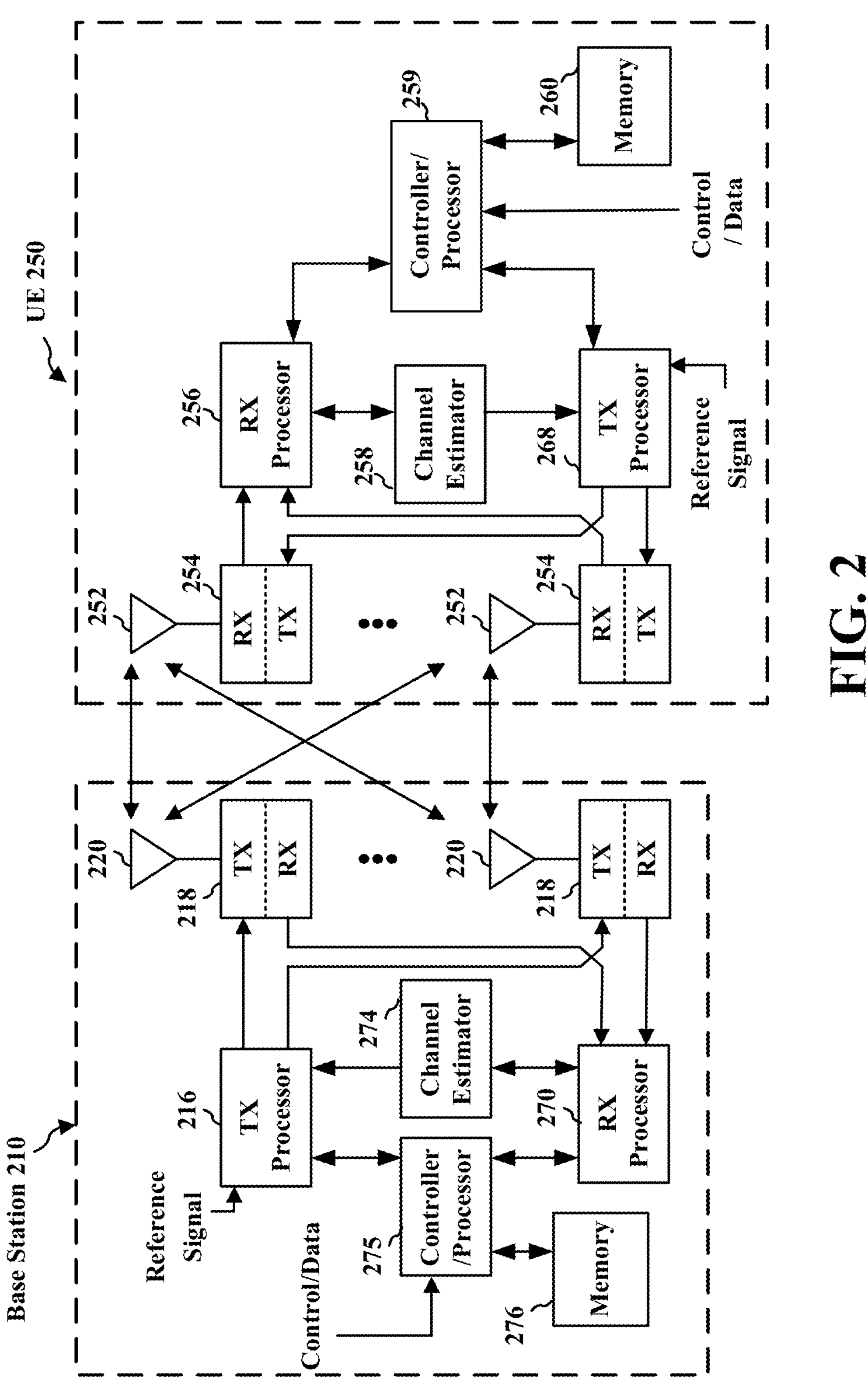
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHZ), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
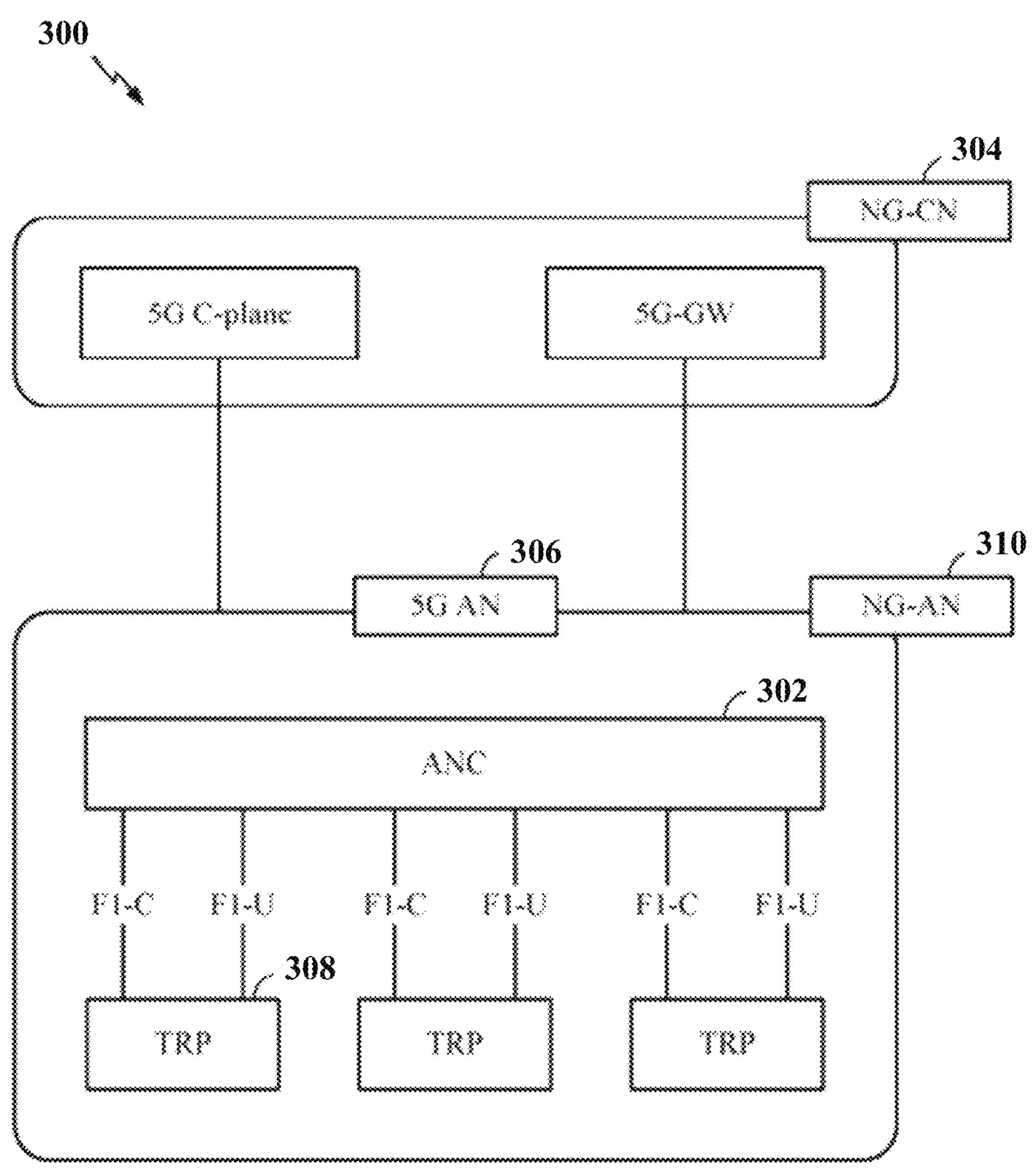
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with “cell.”

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
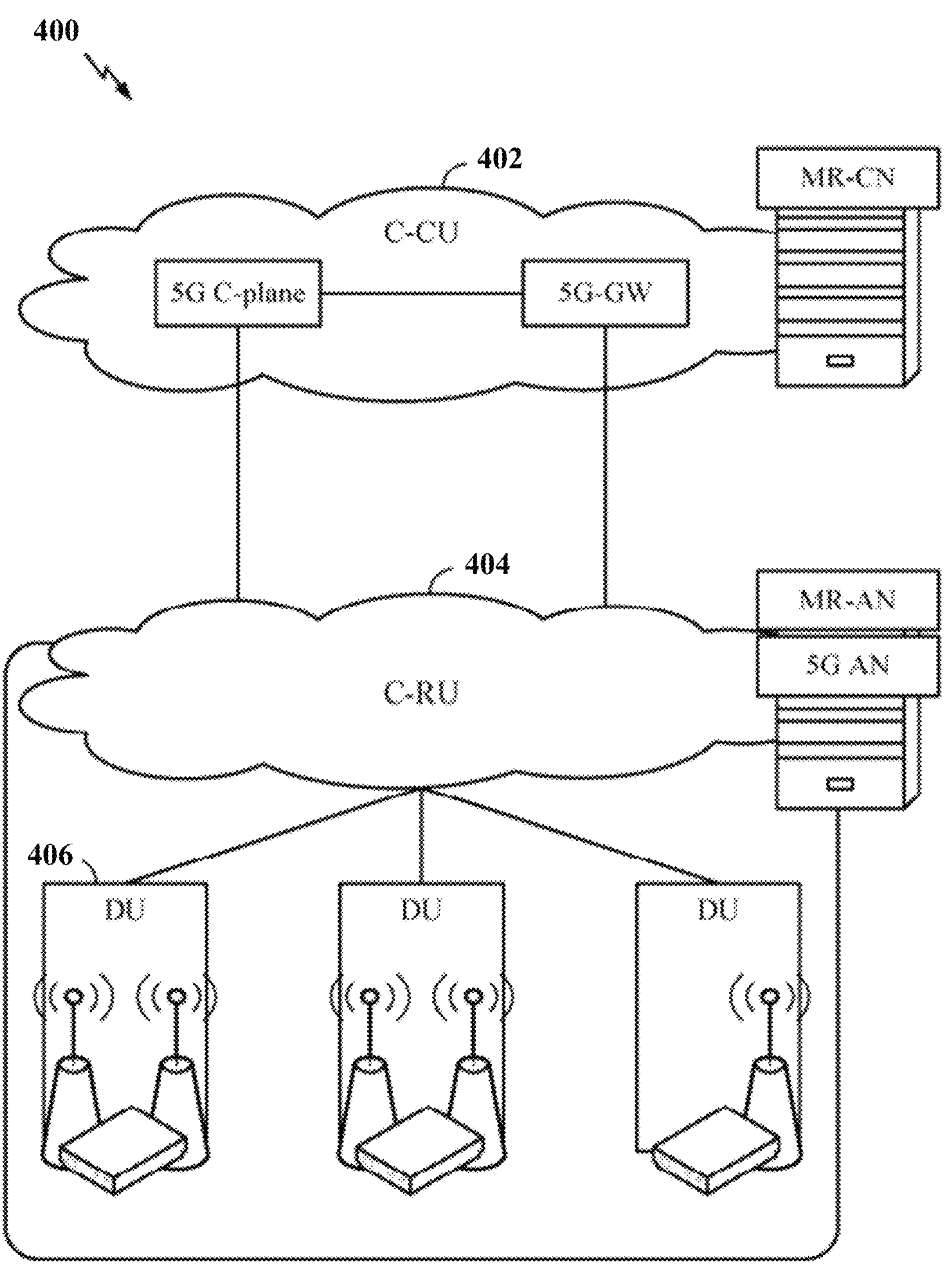
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The 6G radio access technology is expected to support extreme communication requirements in terms of throughput, latency, and reliability. Recent 6G overview literature has identified a plethora of unique technologies for the support of the demanding 6G services, with "subnetworking" being one of the emerging major topics. The main objectives of deploying subnetworks include offloading most demanding services from the classical macro networks, to support extreme performance requirements at any suitable location and at any time. This is important, as it is expected to have increasingly much more demanding future services, which require offloading of the most constraining functions/services from some user devices to their neighboring devices, in addition to the classical macro networks (i.e., edge computing).

Noticeably, the state-of-the-art network resource sharing and computation offloading systems including 4G and 5G networking technologies, has the following limitations. (1) One requires service provisioning by the network operators: Applications or Services that may use distributed compute resources must be pre-provisioned by the network operator. Consequently, the (new) applications/services that are not pre-provisioned cannot use distributed resources. (2) The scope of the service-based architecture (SBA) in 5G is limited to the Core Network (CN) domain. It does not extend to the Radio Access Network (RAN) domain and does not include the user device domain. Thus, Virtual Network Function (VNF) distribution to the end-devices is limited. (3) To use the compute resource sharing, any user device must be subscribed to a network operator and must be connected to the operator's network. Thus, the non-registered user devices cannot use the compute resource sharing. Providing compute resource sharing to the subscribed user devices is simpler to manage by the network operators in terms of network security. However, considering the sheer increase of the number of user devices that may not require direct connectivity to an operator's network to be operational (e.g., wearables, ambient devices, IoT sensors), extending the compute resource sharing to unsubscribed user devices promises new business opportunities and potential new revenue streams (e.g., possibility to opt in compute resource sharing services subject to some attractive incentive-based policies). The network security concerns related to unsubscribed user devices may be eliminated/alleviated with various network virtualization and isolation methods, which detect the malicious software and prevent its propagation deeper into the network.

Hence, there is a need for methods to support discovering the compute capabilities of user devices and network nodes, which enable any user device that needs additional resources (in support, or even better QoS support, of various applications) to take advantage of remote compute resources which may be found in other user devices and/or network nodes and are allowed to be used for that purpose.

One aspect of the disclosure relates to a mechanism for discovering the compute capabilities of user devices and network nodes that are applicable to subnetworks and device cloud, and for establishing connectivity via subnetworks between a user device and other neighboring user devices and/or network nodes which are capable of providing the remote compute resources to support various application in the user device.

In the disclosure as follows, the terms "subnetwork," "user device centric network" and "device cloud" may be interchangeably used, although, generally speaking, subnetworks are a part of the scope of the user device centric networks and device cloud. The device cloud is a dynamic cluster of nodes built around a user device, which may include other user devices and/or network nodes working together to execute a software task, such as a distributed module of an application or a service running on the said user device. Hence, in a general sense, the dynamicity of the cluster defining the device cloud is determined by a given application, i.e., the device cloud can change in topology/configuration and nodes composition from application to application. The subnetwork is a network that connects user devices and/or other end-devices, such as unmanned devices or IoT devices.

Figure 7:
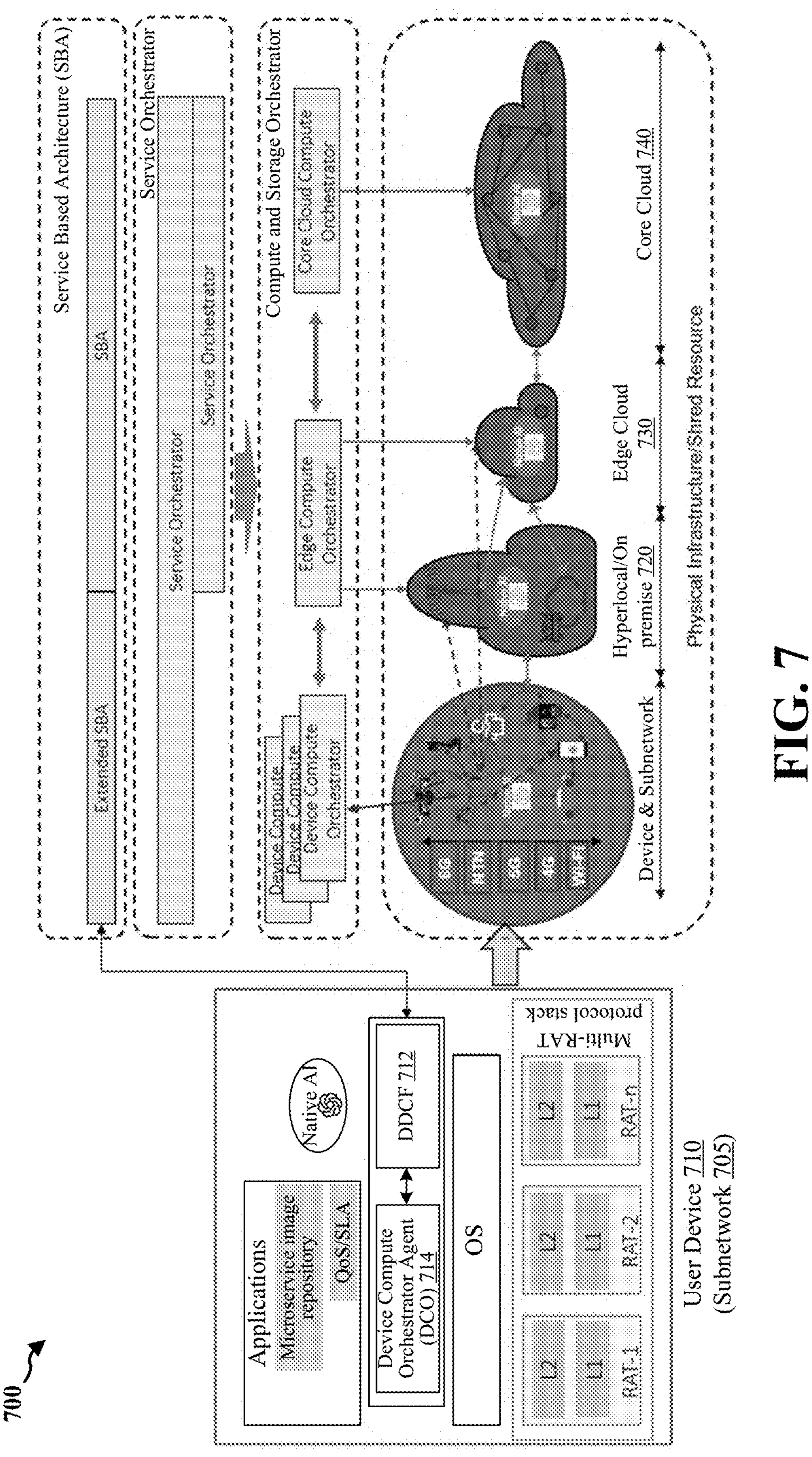
FIG. 7 is a diagram illustrating a user centric network architecture and computer resource orchestrators.

FIG. 7 is a diagram illustrating a user centric network architecture and computer resource orchestrators. As shown in FIG. 7, the architecture 700 includes a core cloud 740, an edge cloud 730, a hyperlocal/on premise cloud 720 (e.g., a base station (BS), an access point (AP), and/or a gateway (GW)), and devices and subnetworks. Specifically, the term "device" herein refers to any device or system that is connected to a network, which may be a user device or a network node. In the architecture 700, a user device 710 (which is defined as an end user device or a peripheral device, such as a smartphone or a smart glass) may support multi-RATs, such as 6G, 5G NR, LTE, Wi-Fi, and Bluetooth. Examples of the user device 710 may include, without being limited to, an IoT device, a camera, a drone, a smartphone, a smart glass, a smart watch, or other types of user devices. In certain embodiments, the user device 710 may be in a subnetwork 705, which is formed by the user device 710 and/or other devices (e.g., other user devices and/or network devices).

As shown in FIG. 7, the user device 710 is provided with a distributed device cloud function (DDCF) 712, which is a device cloud/user centric network management module in the user device/UE 710 that handles the communication with other neighboring devices via the underlying access technologies. Unlike the typical cloud orchestration or network orchestration, the user device 710 autonomously manages its own compute orchestrator, which is herein named a "device compute orchestrator" (DCO) 714, that can operate independently without being connected to the operator's network. Specifically, the user device 710 includes both the DDCF 712 and the DCO 714 to enable the DDCF operation without being connected to an overlay network. To increase the scalability of supported applications which use the compute resource sharing service (often referred as Compute as a Service (CaaS)), any application relying on CaaS and containing the necessary microservice images may use the device (which may be any device or system that is connected to a network, such as a user device or a network node) and network compute resource sharing service without being provisioned in the operators' network. The necessary microservice images may also be located in a network repository with network connectivity requirement. It is recommended to define the QoS information for the application and microservices that will be used so that one can identify/find the appropriate amount of device/network resources. If this information is not provided, then a default configuration could be used.

When a device (e.g., the user device 710) is connected to the network and a pre-provisioned service is instantiated, the compute orchestrator of the edge cloud 730 and the compute orchestrator of the core cloud 740 under the service orchestrator support the (user) device in a traditional manner. In addition to the network centric service, a compute resource sharing service provided by a user device centric network (or a device cloud) enables the hyper-local, edge and core clouds to actively provide the necessary network capabilities information to the connected user device 710. The (user) device compute orchestrators and the device cloud network management modules may become a part of an extended SBA of the network operator, and may be managed by the operator, providing the connected user device is subscribed to the network operator. In this way, a connected (user) device can forward the retrieved capabilities information (or received messages) from the overlay network to other (user) devices in the user device centric network which are not directly connected to the overlay network. On the other hand, an unsubscribed user device, which is not directly connected to the overlay network, may be clustered in the subnetwork, such that the subscribed user device may forward the capabilities information, and the unsubscribed user device may receive the capabilities information forwarded by the subscribed user device, and vice versa.

As an example, the smartGlass runs its own DCO (shown in the solid arrow) and uses compute resources from the smartphone device, hyper-local (on premise) cloud and edge cloud (shown in the dotted arrows) in FIG. 7. A device centric network could be connected to multiple operator networks at the same time, but the description in the embodiments uses a single operator case for simplicity.

Figure 8:
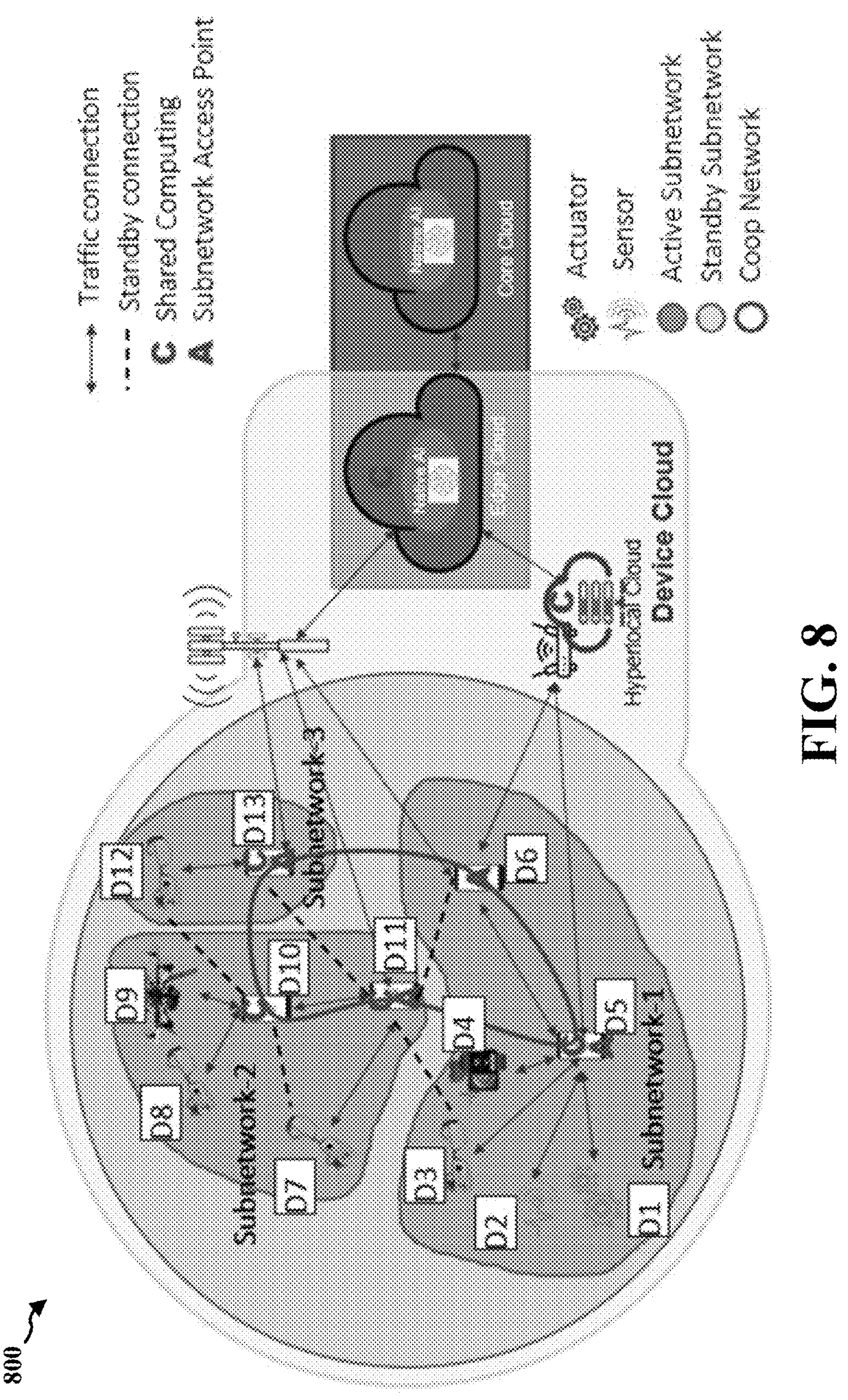
FIG. 8 is a diagram illustrating multiple subnetwork formation, connectivity and multi-connectivity.

FIG. 8 is a diagram illustrating multiple subnetwork formation, connectivity and multi-connectivity. As shown in FIG. 8, in the device cloud/network 800, a plurality of subnetworks (namely subnetwork-1, subnetwork-2 and subnetwork-3) are formed by a plurality of user devices D1 to D13, and a plurality of network nodes are provided in a hyperlocal cloud (e.g., a base station (BS), an access point (AP), and/or a gateway (GW)), an edge cloud and a core cloud. The subnetwork-1 includes devices D1, D2, D3, D4, D5 and D6. The subnetwork-2 includes devices D7, D8, D9, D10 and D11. The subnetwork-3 includes devices D12 and D13. The three subnetworks (i.e., subnetwork-1, subnetwork-2 and subnetwork-3) are interconnected. Each subnetwork contains one or more APs and the proximity APs autonomously build a network. Specifically, among all the devices D1-D13, the devices D5, D6. D11 and D13 are APs. The main service operation is supported in each subnetwork, but surrounding information and network control messages could be exchanged, and the interconnection between subnetworks may be restructured. For example, the subnetwork-2 includes five user devices D7, D8, D9, D10 and D11, and two of them share compute resources (i.e., devices D10 and D11, marked as "C") with other devices in the same subnetwork and one of the devices (i.e., the device D11, marked as "A") performs an AP role. The AP device D11 shares the network connectivity to the overlay network (i.e., macro infrastructure). The solid arrow lines indicate active traffic connections that carry user traffic between the connected devices. The dotted lines indicate standby connections that are not being used for user traffic delivery, but the devices connected with dotted lines may be switched from the standby connection mode to an active connection mode when the existing active connections cannot support the required service quality. The subnetwork-1, which include six user devices D1, D2, D3, D4, D5 and D6, also shows that there could be multiple APs (i.e., devices D5 and D6) in a subnetwork (e.g., multi-connectivity configurations) and connectivity to the overlay network, when available, allows one AP (e.g., the device D6) to act as a relay for some traffic flows.

In certain configurations, to support compute resource sharing in a network, including user devices or device centric networks, stateless CaaS may be considered for sharing resources from a mobile device, because (i) a mobile device in the network may be disconnected at any time and (ii) a new mobile device may be added to the network. However, if a fixed device, such as a customer premises equipment (CPE), which could be installed in a building (i.e., location proximity) or at the edge cloud in the overlay network, is used for sharing compute resources, the microservices do not need to be limited to stateless functions. Since the configuration of devices connected to a network may vary over time (i.e., devices may come and go), a device orchestration may be required to dynamically deploy, redeploy, and recover the microservices.

As Kubernetes (K8s) currently dominate the container orchestration market (more than 85%), the K8s structure may be used as an exemplary embodiment for the orchestration mechanism. However, other lightweight orchestration systems or simplified Kubernetes such as K3s, KOs, and microK8s could be used for a practical deployment because the variants of K8s require less resource than K8s, contain simplified management, and support many small clusters. The cluster is the foundation of the K8s objects representing all containerized applications, and applications run on top of a cluster, guided by the K8s cluster master node, which keeps things moving by determining what runs on the cluster's worker nodes. It should be noted that, although the terms "master node" and "worker node" are used throughout the disclosure, in the K8s community, the terms "master node" and "worker node" have been renamed to "control plane" and "node" respectively. Essentially, the nodes share resources with each other and act as a single powerful machine.

When deploying an application on a cluster, the cluster master schedules its deployment and distributes the work to be installed on the worker nodes. These worker nodes run the services that support the containers inside them, starting and stopping application's activity, all according to the cluster master requests. Because the nodes are "workers," the cluster master oversees the activity on each node. Furthermore, these worker nodes report their own status to the cluster master, which in turn determines whether nodes need to be repaired, upgraded, or removed from service. The cluster master may shift work across nodes, as needed, in the event a node fails execution, or in the event when nodes are added or removed. It is the Kubernetes engine that drives all this communication between nodes, the cluster master, and the larger clusters.

Figure 9:
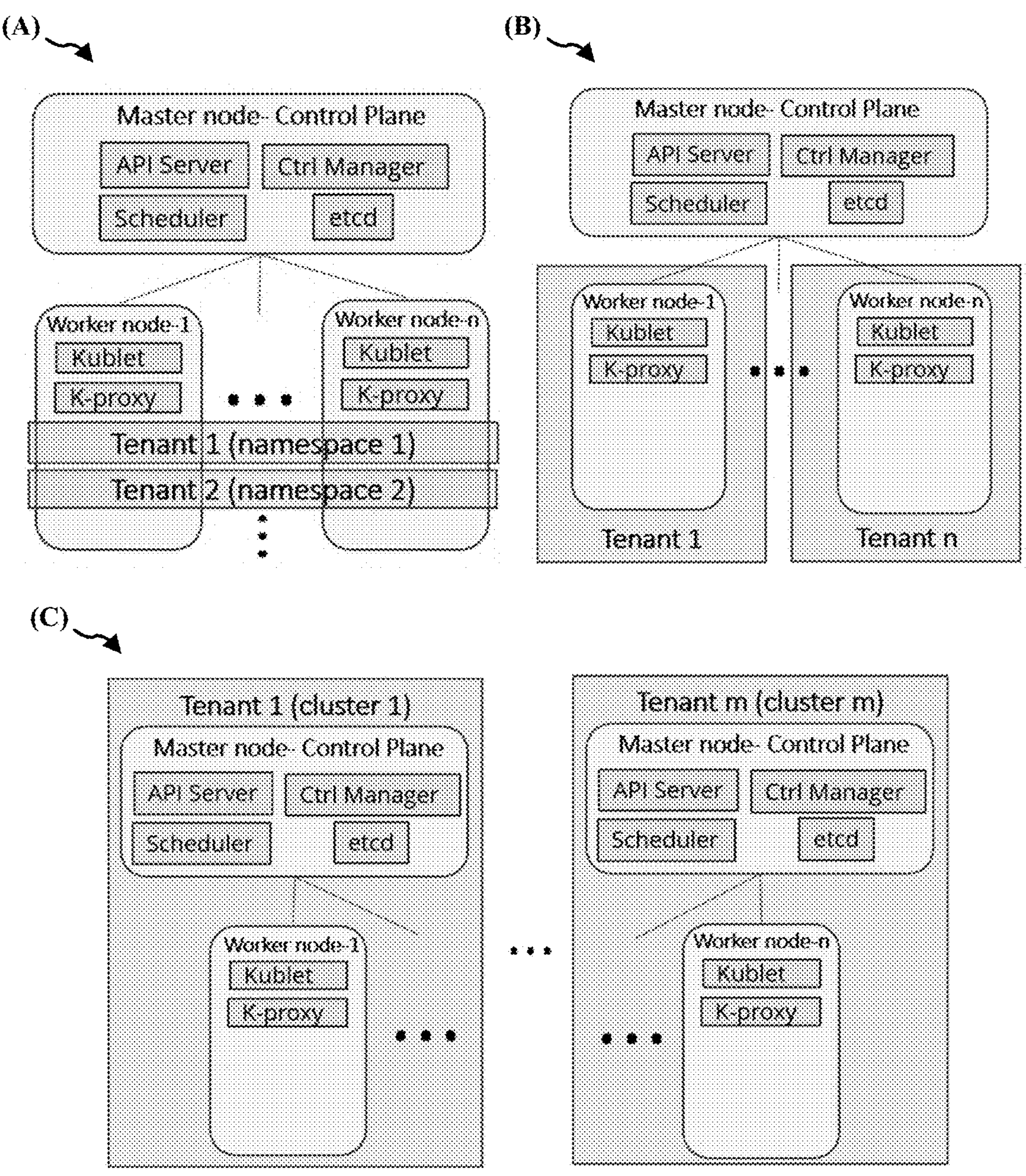
FIG. 9 is a diagram illustrating multi-cluster Kubernetes deployments for (a) single master node and namespace-based tenant separation, (b) single master node and worker node-based tenant separation, and (c) separate master node and worker nodes per tenant.

In certain configurations, since a network structure may vary frequently, any user device in the network may instantiate one or more services, and not all neighboring devices may be suitable to support every service request, the cluster building process must be dynamic by nature, and multiple clusters need to be deployed in a network. Specifically, there are a few ways envisaged to manage multiple clusters:

FIG. 9 is a diagram illustrating multi-cluster Kubernetes deployments for (a) single master node and namespace-based tenant separation, (b) single master node and worker node-based tenant separation, and (c) separate master node and worker nodes per tenant. Specifically, the scenarios as shown in FIG. 9 (*a*)-(*c*) are typical Kubernetes cluster deployment scenarios, but they are not flexible enough for the device cloud environment. This is because the microservice images to be deployed for certain services from different devices may be new to the other devices, and even if there was a repository in the overlay network, the network connection to the repository may simply not exist when the service is instantiated. Hence, the microservice images must be distributed from the device which instantiates the service and takes the master node role and worker node role at the same time if the device is capable of running both master and worker roles, because there may not be any other device to join the cluster (at least at the service instantiation phase), excluding the case that an application is designed or executed to not be distributed.

Figure 10:
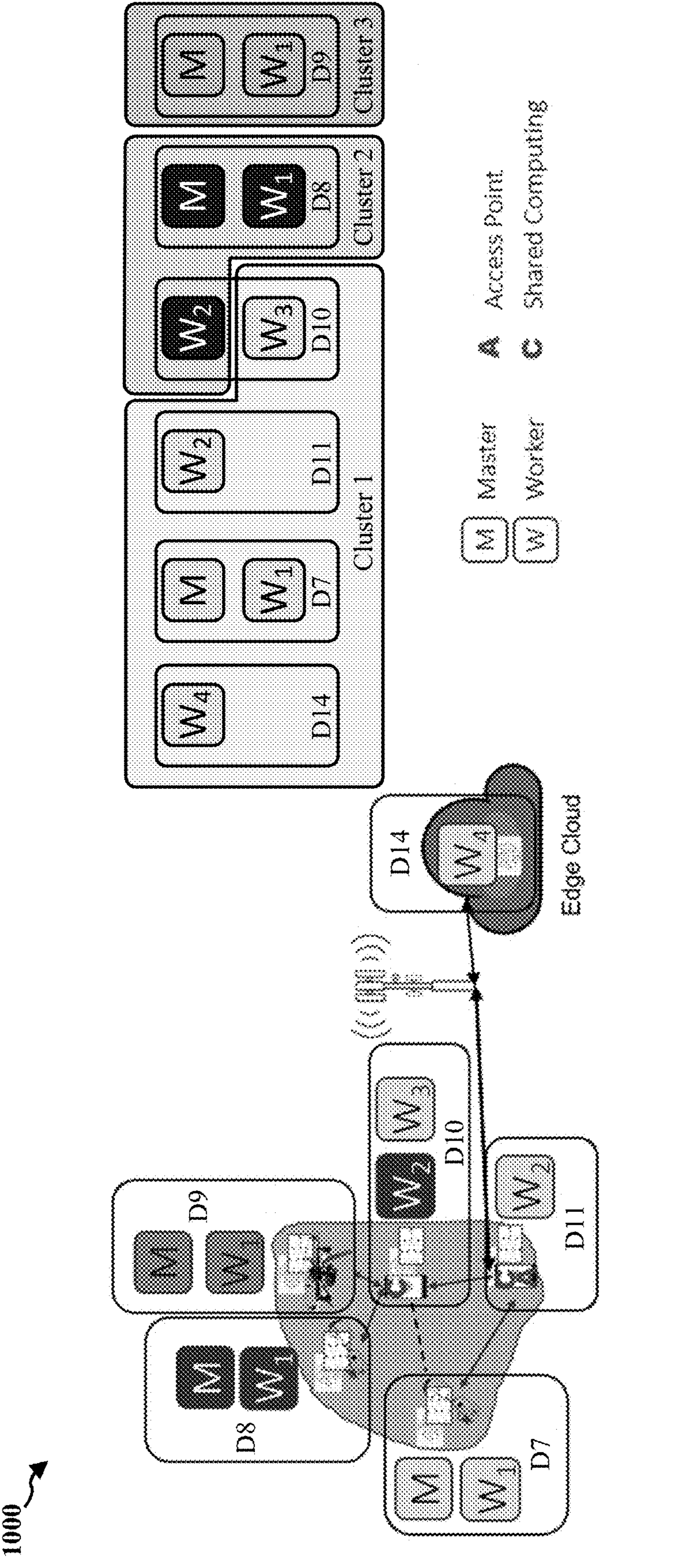
FIG. 10 is a diagram illustrating multi-cluster Kubernetes deployments for separate master node per tenant device and namespace-based, container-based, or any form of isolation-based tenant separation in worker node.

FIG. 10 is a diagram illustrating multi-cluster deployments for separate master node per tenant device and namespace-based, container-based, or any form of isolation-based tenant separation in worker node. Specifically, the device index in FIG. 10 matches to the devices in the subnetwork-2 in FIG. 8, which includes user devices D7, D8, D9, D10 and D11, and a network node D14 in the edge cloud. As shown in FIG. 10, the user device D9 is in a scenario where the device runs both master and worker roles, as the cluster 3 includes the user device D9 only. If other devices may provide compute resources, they join the corresponding cluster. The cluster 1 includes four devices (devices D7, D10, D11, and D14), and the cluster 2 includes two devices (user devices D8 and D10). The user device D10 belongs to multiple clusters (cluster 1 and cluster 2). Therefore, user device D10 must be configured to respond to both cluster 1 master node (on the user device D7) and cluster 2 master node (on the user device D8), independently.

Generally, a device (e.g., a user device) that initiates the application is selected to run the orchestrator. For example, as shown in FIG. 10, the user device D7 is the device running the orchestrator for the cluster 1, and the user device D8 is the device running the orchestrator for the cluster 2. In certain configurations, if the device that initiates the application is unable to run an orchestrator due to various considerations, such as inadequate computing power or to conserve battery, a suitable device that is part of the cluster may be selected to operate the orchestrator. The suitable device may be either a user device or a network node (e.g., when the user device is connected to the operator's network). The selection criteria could be based on various criteria, such as the amount on the compute resource availability, priority of the device type (e.g., network node, CPE, smartphone), or pre-provisioning/configuration. In the process of electing an orchestrator, there may be multiple candidates for the orchestrator role. Among these candidates, one is designated as the active orchestrator, while the other candidates not being selected remain on standby to enhance reliability. Should the active orchestrator be unable to fulfill its duties, for reasons such as a loss of, or poor connectivity, one of the standby orchestrators will perform the role of the active orchestrator.

In certain configurations, in a device cloud, if a renter device (i.e., the device/entity lending resources) wants to share either compute or network connectivity resources (or simultaneously both), the renter device performs the following actions. (1) In an active mode, the renter device periodically broadcasts a device capability message indicating the intention of sharing resources and/or providing traffic forwarding service, and listens for inquiry packets from the potential tenant devices (i.e., the device/entity borrowing resources). (2) Alternatively, in a passive mode, the renter device only listens for inquiry packets from the potential tenant devices (i.e., without broadcasting the device capability message).

On the other hand, a potential tenant device looking for renter devices performs the following actions. (1) In a passive mode, the potential tenant device scans a device capability message, and sends a resource inquiry message if an eligible renter device is discovered. (2) Alternatively, in an active mode, the potential tenant device periodically sends a Resource inquiry message. In certain configurations, the different modes of device capability discovery mechanisms may be configured depending on the amount of traffic generation and the discovery latency. Any combination of modes from the renter and tenant works, except for the passive mode combination for both renter and tenant devices. In other words, at least one of the renter/tenant devices must be in the active mode.

In certain configurations, an exemplary embodiment is provided in which a renter device is in the active mode and a tenant is in the passive mode. In this case, the renter device in a device cloud or in the operator's edge cloud, which wants to share either compute or network connectivity resources, performs the following actions: (i) it periodically broadcasts a device capability message indicating the intention of sharing resources and/or providing traffic forwarding service, and (ii) it listens for resource inquiry messages from the potential tenant devices. In response to receiving the device capability message, a potential tenant device needs to transmit the resource inquiry message after a random period of time, in order to avoid collision with other potential tenant device(s) that may also send resource inquiry message(s) in response to the same device capability message at the same time. In certain embodiments, the resource inquiry message includes a device Universally Unique Identifier (UUID) and other connection related information, which may be used later between the tenant and the renter devices. Once the renter device receives and accepts the resource inquiry message, the renter device joins the orchestration cluster of the tenant device as a worker node.

Figure 11:
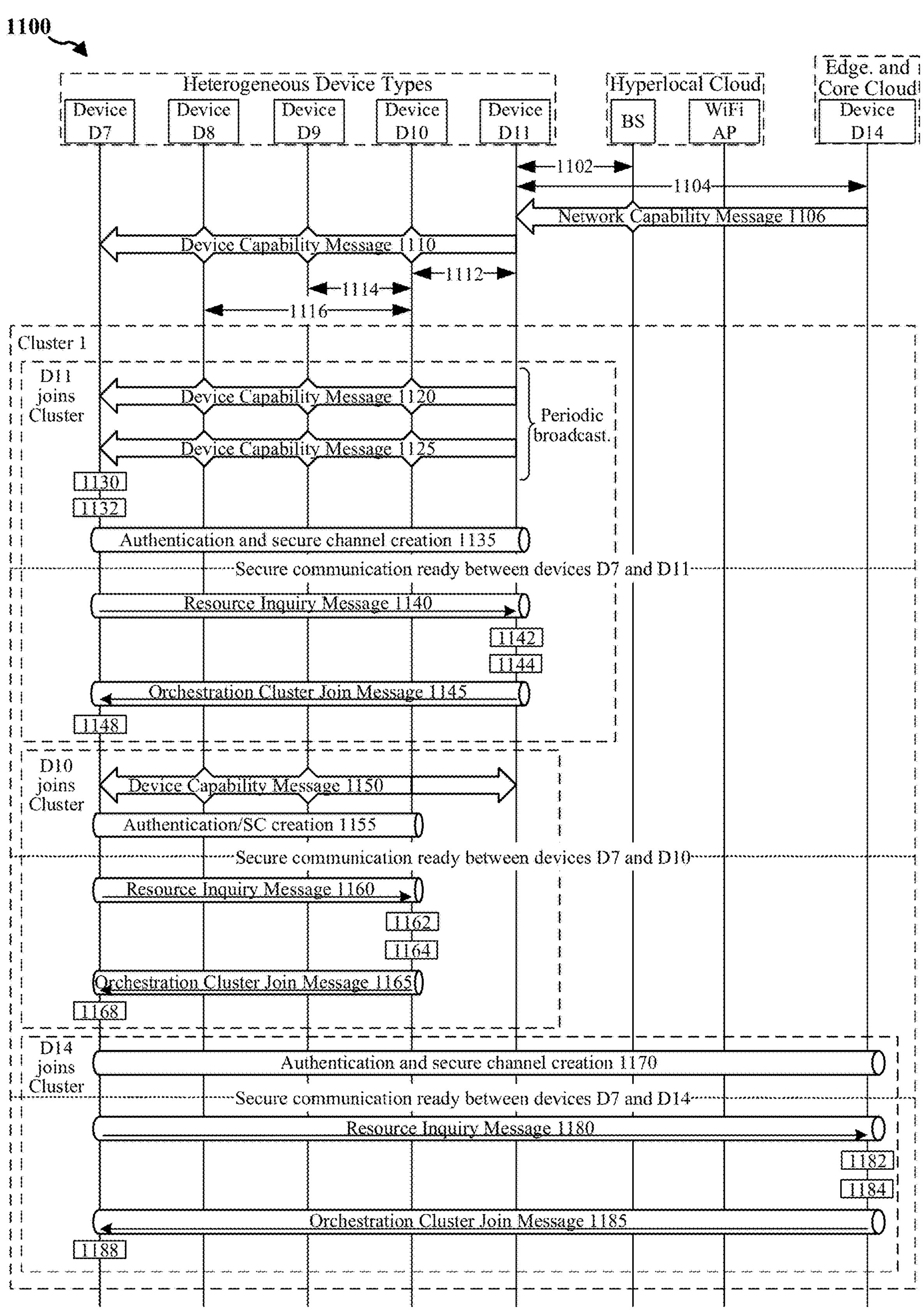
FIG. 11 is a diagram illustrating a device centric orchestration cluster formation procedure of the subnetwork-2 in FIG. 8 as well as the cluster 1 in FIG. 10.

FIG. 11 is a diagram illustrating a device centric orchestration cluster formation procedure of the subnetwork-2 in FIG. 8 as well as the cluster 1 in FIG. 10. As shown in FIG. 10, in the procedure 1100, the devices involved include heterogeneous device types (i.e., user devices) D7, D8, D9, D10 and D11, network nodes BS (i.e., a base station) and WiFi AP (i.e., an AP under the WiFi protocol) in the hyperlocal cloud, and a network node D14 in the edge cloud/core cloud. During the procedure 1000, a cluster (e.g., cluster 1) is created by the user devices D7, D10, and D11 as well as the network node D14, in which the user devices D10 and D11 and the network node D14 function as renter devices, and the user device D7 functions as a tenant device.

The procedure 1100 starts will a formation of the subnetwork-2. At operation 1102, the user device D11 connects to the base station BS of the overlay network and performs the corresponding connection setup. At operation 1104, the user device D11 connects to the network (i.e., the network node D14 in the edge cloud/core cloud) and performs the corresponding connection setup, such that the user device D11 is internet accessible. Once the user device D11 is connected to the network, the hyperlocal cloud (e.g., the base station BS) or the edge cloud/core cloud (e.g., the network node D14) may send compute resource sharing intention messages (i.e., a network capability message 1106) to the user device D11 if network resources are available in any of these network nodes (e.g., the base station BS and the network node D14) in the clouds. From now on, the user device D11 may act as a proxy device of the network resource information for the child devices (e.g., user devices D7, D8, D9 and D10) in the future.

Upon receiving the network capability message 1106, the user device D11 broadcasts a periodic compute and connectivity sharing intention message (e.g., the device capability message 1110) to indicate the intention of sharing the compute resources or the network connectivity resources (i.e., as a renter device) or providing traffic forwarding services to the neighboring user devices in the subnetwork-2 (i.e., as a proxy device). In addition, the user device D11 may also forward the compute resource sharing intention message (i.e., the network capability message 1106) received from the hyperlocal cloud, edge cloud or core cloud, providing that network resources are available in any of these clouds. Specifically, the user device D11 may generate, by its DDCF, a DDCF message including the capability information in the network capability message 1106 received, and then add the device capability information into the DDCF message, thus creating the device capability message 1110 to be broadcasted. Thus, all neighboring user devices D7, D8, D9 and D10 may receive the same message.

At operation 1112, the user device D10 connects to the user device D11 to share the network connectivity from the user device D11. At operation 1114, the user device D9 is connected to the user device D10. At operation 1116, the user device D8 is connected to the user device D10. At this stage, the subnetwork-2 is currently formed by the user devices D8, D9, D10 and D11. It should be noted that the user devices D8 and D9 are not directly connected to the user device D11 and to each other. However, with the connections to the user device D10, all the user devices D8, D9, D10 and D11 in the subnetwork-2 are interconnected. Once the subnetwork-2 is established, the user device D11 may periodically broadcast new device capability messages 1120 and 1125. In certain embodiments, the capability information in the device capability messages 1120 and 1125 may be identical. Alternatively, the capability information in the device capability messages 1120 and 1125 may be different, as the user device D11 may dynamically determine that the availability of the resources (e.g., compute resources and/or network connectivity resources) for sharing has changed at any time, based on the actual operational status of the user device D11.

At operation 1130, a user device D7, which is not part of the subnetwork-2 yet, starts an application that works better with more compute resources. In certain embodiments, the application may include a service profile (e.g., QoS information) for identifying the compute resources and the network connectivity resources required.

At operation 1132, the user device D7 instantiates an orchestration function, a master node (controller) M, and a worker node W1, thus creating the cluster 1. At this time, the cluster 1 is a standalone orchestration cluster that contains both master and worker roles in the same device D7. Thus, the application may run on the user device D7 without support from other devices, i.e., even though the performance may not be of best possible quality it falls within acceptable quality levels.

Since the user device D7 has received a device capability message (e.g., the device capability messages 1110, 1120 and 1125, or a new device capability message not shown in FIG. 11) from the user device D11 earlier, the user device D7 may determine, based on the service profile of the application, that the available resources in the user device D11 would improve the performance of the application being executed on the user device D7 alone.

Once the user device D11 has been identified as a potential renter device, the orchestrator (i.e., the DCO) in the tenant device D7 works together with the orchestrator agent modules (i.e., the DCO) in the identified renter device D11. At operation 1135, an authentication and secure channel creation process is performed between the user device D7 and the user device D11. In certain embodiments, the secure communication channel between the user devices D7 and D11 may be established using an existing authentication and secure channel creation mechanism, such as SSL, TLS, or CA. Alternatively, the user device D7 may go through an authentication process to communicate with the user device D11 and creates the secure communication channel between the user devices D7 and D11. In this case, the user device D7 joins the subnetwork-2, which is now formed by the user devices D7, D8, D9, D10 and D11, and the secure communication channel between the user devices D7 and D11 is ready.

Once the secure channel is created, the user device D7 sends a resource inquiry message 1140 to the user device D11. In particular, the resource inquiry message 1140 includes an inquiry request for the expected resource usage, and the information for the user device D11 to join the orchestration cluster (i.e., the cluster 1) of the user device D7. In certain embodiments, the information for the user device D11 to join the orchestration cluster may be in the form of a cluster join command, which is generated by the DCO of the user device D7. In certain embodiments, the user device D7 may generate, by its DDCF, a DDCF message including the inquiry request with the information of the user device D7 (as a potential tenant device) and the user device D11 (as a destination device/renter device) and the cluster join command, thus creating the resource inquiry message 1140. In the exemplary embodiment as shown in FIG. 11, the user devices D7 and D11 directly communication with each other through the secure communication channel between the user devices D7 and D11. In one embodiment, if the user devices D7 and D11 are not in a direct secure communication, the path of the resource inquiry message 1140 may require one or more intermediate devices (i.e., proxy devices) between the user device D7 and the user device D11, and the DDCF message may also include information of the proxy devices. Upon receiving the resource inquiry message 1140, the user device D11 determines, based on the cluster join command, whether it should accept or reject the inquiry request. Specifically, the DDCF of the user device D11 may extract the cluster join command from the resource inquiry message 1140 and send the cluster join command to the DCO of the user device D11, and the DCO of the user device D11 may determine whether the inquiry request should be accepted (e.g., whether the user device D11 intends to join the cluster 1 of the user device D7).

At operation 1142, if the user device D11 accepts the inquiry request, the DCO of the user device D11 creates a new virtual device, which may be a new namespace, container, or any form of isolation, to isolate the new orchestration cluster (i.e., cluster 1) from other prior orchestration clusters in the user device D11. Specifically, if a renter device supports only a single tenant device at any given time, it is possible that a separate isolation space does not need to be created in the renter device. However, if a renter device (e.g., the user device D11) is capable to support multiple tenant devices at the same time or if secure separation from the renter device is required, the renter device must be capable of behaving as multiple virtual devices, because the renter device must interact with multiple orchestration cluster master controllers, independently, and privacy must be enforced between the tenant software space and the renter device user space. Then, at operation 1144, the user device D11 instantiates, by the DCO, a workload prediction model, if the workload prediction model has not been already instantiated. Specifically, a ML-based "workload model" aims at estimating communication and compute resources demand (e.g., CPU load, memory usage, processing time duration) over a time-interval, and optimize the resource usage.

Then, the user device D11 sends back to the user device D7, through the secure communication channel, an orchestration cluster join message 1145 using the information delivered from the resource inquiry message 1140. In certain embodiments, the user device D11 may generate, by its DDCF, a DDCF message including the response to inquiry request (which is generated by the DCO of the user device D11) with the information of the user device D7 (as the potential tenant device/destination device), the user device D11 (as the renter device), and optionally any intermediate proxy device(s) if necessary, as well as the cluster join command in the resource inquiry message 1140, thus creating the orchestration cluster join message 1145. Upon receiving the orchestration cluster join message 1145, at operation 1148, the user device D7 configures the user device D11 (or more precisely, the virtual machine created on the user device D11) as a new worker node W2 in the orchestration cluster (i.e., cluster 1). Specifically, the DDCF of the user device D7 processes the orchestration cluster join message 1145 and extract the cluster join command therein, and the DCO of the user device D7 acknowledges the intention of the user device D11 to join the orchestration cluster based on the cluster join command, and configures the new worker node. Once the join process is completed at the user device D7, the user device D11 successfully joins as a worker node in the cluster 1, and the cluster 1 now includes two user devices D7 and D11, with a single master node M (i.e., the user device D7) and two worker nodes (i.e., D7 as W1 and D11 as W2).

Then, the user device D10 in the subnetwork-2 may also broadcast a device capability message 1150 to indicate its intention to share the resources. In certain embodiments, the user device D10 may dynamically determine, at any time, that the resources (e.g., compute resources and/or network connectivity resources) thereon is now available for sharing based on the operational status of the user device D10. Upon receiving the device capability message 1150, the user device D7 may want to use more compute resources. Thus, at operation 1155, an authentication and secure channel creation process is performed between the user device D7 and the user device D10, and the user device D7 goes through the authentication process to communicate with the user device D10 and creates a secure channel between the user devices D7 and D10. Once the secure communication channel between the user devices D7 and D10 is ready, the user device D7 may sends a resource inquiry message 1160 to the user device D10 with an inquiry request for the expected resource usage, and the information for the user device D10 to join the orchestration cluster (i.e., the cluster 1) of the user device D7 (e.g., a cluster join command generated by the DCO of the user device D7). The generating and delivery process of the resource inquiry message 1160 is similar to generating and delivery of the resource inquiry message 1140, and details thereof are not further elaborated. Upon receiving the resource inquiry message 1160, the user device D10 determines, based on the cluster join command, whether it should accept or reject the inquiry request.

At operation 1162, if the user device D10 accepts the inquiry request, the DCO of the user device D10 creates a new virtual device, which may be a new namespace, container, or any form of isolation, to isolate the new orchestration cluster (i.e., cluster 1) from other prior orchestration clusters in the user device D10. Specifically, as shown in FIG. 10, if the user device D10 already has functioned as a renter device/worker node in another cluster (i.e., cluster 2), the user device D10 must create another virtual device to ensure that the two virtual devices (respectively corresponding to the two clusters 1 and 2) are independent from each other. Then, at operation 1164, the user device D10 instantiates, by the DCO, a workload prediction model, if the workload prediction model has not been already instantiated. The operations 1162 and 1164 are similar to the operations 1142 and 1144, and details thereof are not further elaborated.

Then, the user device D10 sends back to the user device D7, through the secure communication channel, an orchestration cluster join message 1165 using the information delivered from the resource inquiry message 1160. The generating and delivery process of the orchestration cluster join message 1165 is similar to generating and delivery of the orchestration cluster join message 1145, and details thereof are not further elaborated. Upon receiving the orchestration cluster join message 1165, at operation 1168, the user device D7 configures the user device D10 (or more precisely, the virtual machine created on the user device D10) as a new worker node W3 in the orchestration cluster (i.e., cluster 1). The operation 1168 is similar to the operation 1148, and details thereof are not further elaborated. Once the join process is completed at the user device D7, the user device D10 successfully joins as a worker node in the cluster 1, and the cluster 1 now includes three user devices D7, D10 and D11, with a single master node M (i.e., the user device D7) and three worker nodes (i.e., D7 as W1, D11 as W2, and D10 as W3).

At this stage, the user device D7 may still want to use more compute resources. Thus, at operation 1170, an authentication and secure channel creation process is performed between the user device D7 and the network node D14 in the edge cloud, and the user device D7 goes through the authentication process to communicate with the network node D14 and creates a secure channel between the user device D7 and network node D14. Once the secure communication channel between the user device D7 and network node D14 is ready, the user device D7 may sends a resource inquiry message 1180 to the network node D14 with an inquiry request for the expected resource usage, and the information for the network node D10 to join the orchestration cluster (i.e., the cluster 1) of the user device D7 (e.g., a cluster join command generated by the DCO of the user device D7). The generating and delivery process of the resource inquiry message 1180 is similar to generating and delivery of the resource inquiry messages 1140 and 1160, and details thereof are not further elaborated. Upon receiving the resource inquiry message 1180, the network node D14 determines, based on the cluster join command, whether it should accept or reject the inquiry request.

At operation 1182, if the network node D14 accepts the inquiry request, the DCO of the network node D14 creates a new virtual device, which may be a new namespace, container, or any form of isolation, to isolate the new orchestration cluster (i.e., cluster 1) from other prior orchestration clusters in the network node D14. Then, at operation 1184, the network node D14 instantiates, by the DCO, a workload prediction model, if the workload prediction model has not been already instantiated. The operations 1182 and 1184 are similar to the operations 1142 and 1144 and the operations 1162 and 1164, and details thereof are not further elaborated.

Then, the network node D14 sends back to the user device D7, through the secure communication channel, an orchestration cluster join message 1185 using the information delivered from the resource inquiry message 1180. The generating and delivery process of the orchestration cluster join message 1185 is similar to generating and delivery of the orchestration cluster join messages 1145 and 1165, and details thereof are not further elaborated. Upon receiving the orchestration cluster join message 1185, at operation 1188, the user device D7 configures the network node D14 (or more precisely, the virtual machine created on the network node D14) as a new worker node W4 in the orchestration cluster (i.e., cluster 1). The operation 1188 is similar to the operations 1148 and 1168, and details thereof are not further elaborated. Once the join process is completed at the user device D7, the network node D14 successfully joins as a worker node in the cluster 1, and the cluster 1 now includes four devices (i.e., three user devices D7, D10 and D11, and a network node D14), with a single master node M (i.e., the user device D7) and four worker nodes (i.e., D7 as W1, D11 as W2, D10 as W3, and D14 as W4).

It should be noted that the network node D14 belongs to a network operator and joins the device centric orchestration cluster (i.e., cluster 1) via the user device D11, which is a subscribed user device to the same operator (as the user device D7 is an unsubscribed user device). However, the cluster creation process does not require only a single network operator to join the device centric orchestration cluster, and if there are more subscribed user devices to other operators' networks that are connected to the tenant device (i.e., the user device D7), then more network nodes, similar to the network node D14, from other networks may also join the same device centric orchestration cluster.

Figure 12:
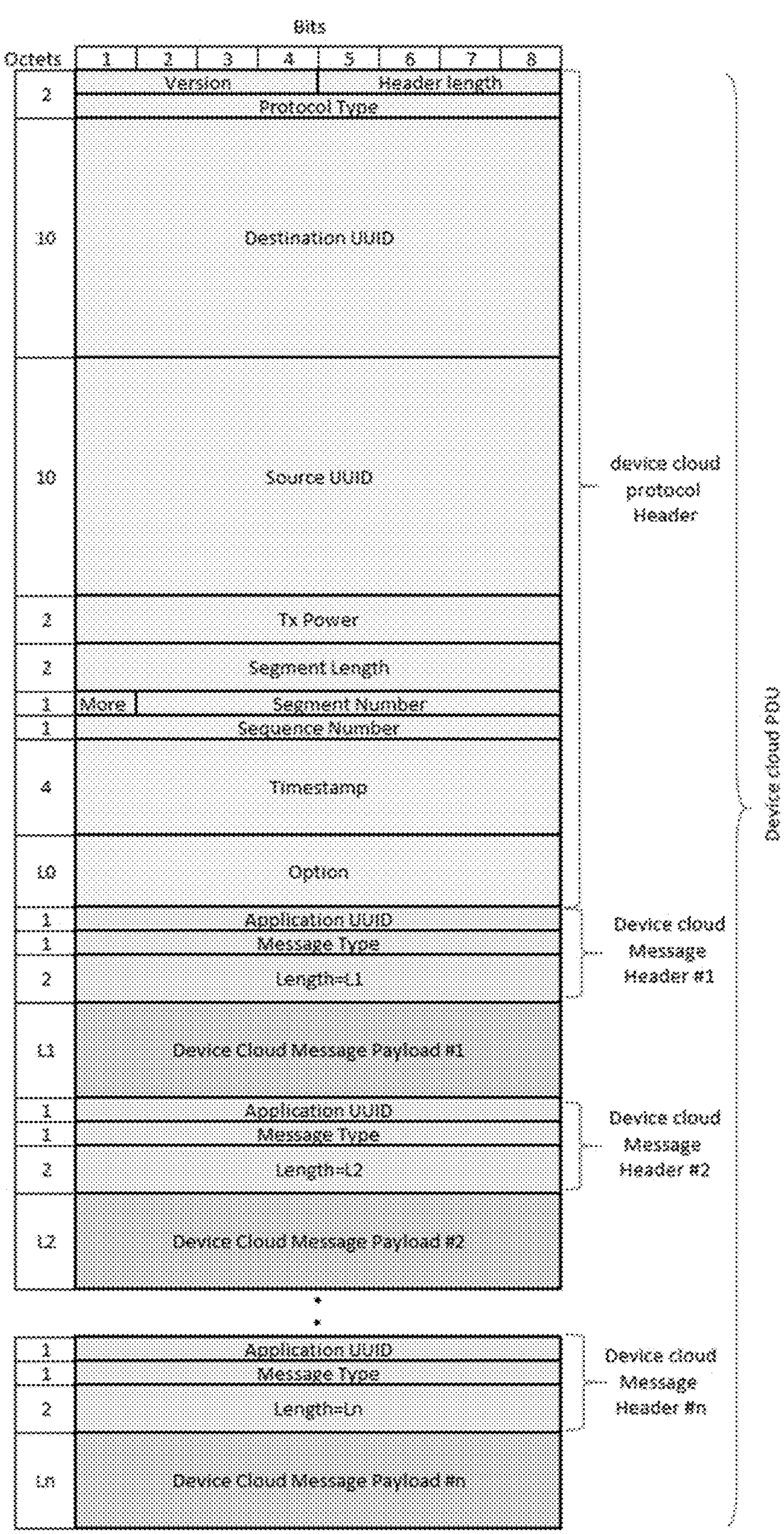
FIG. 12 is a diagram illustrating the device cloud packet structure.

FIG. 12 is a diagram illustrating the device cloud packet structure, which shows the key message definitions, formats, as well as the mandatory and optional parameters in the message payload. As shown in FIG. 12, each device cloud Packet Data Unit (PDU) includes a device cloud packet header and a plurality of device cloud messages #1 to #n. Each device cloud message includes a device cloud message header and a device cloud message payload, and the content in the device cloud message payload depends on the value of the device cloud "Message Type" field in the device cloud message header. Specifically, as discussed above, three device cloud message types have been defined, including the resource inquiry message, the orchestration cluster join message, and the cluster join command message. In certain embodiments, more device cloud message types may be defined later.

In certain configurations, a resource inquiry message is a unicast message transmitted from a tenant device to a potential renter device. Specifically, a potential tenant device uses the Source_UUID (i.e., device ID of the renter device) in a broadcasted device capability message from the renter device as a destination device ID of the resource inquiry message. The resource inquiry message is encapsulated in the device cloud message payload field, and includes the resource requirement information and the cluster join command. Specifically, the "Cluster join command" field includes the join command with an access token for a renter device to use to join the orchestration cluster at the tenant device. This field is optional in the resource inquiry message, and the merit of this optional field is for shortening the cluster join process by eliminating additional message exchanges. In certain embodiments, if the resource inquiry message does not include the cluster join command, the cluster join command must be provided to the renter device after receiving acknowledgement message from the renter device.

In certain configurations, a cluster join command message includes the cluster join command, or an access token is provided by a tenant device to a renter device. This message is a unicast message from a tenant device to a renter device, particularly in the case where the tenant device sends a resource inquiry message without the cluster join command, such that the tenant device must send an additional message to the renter device with the cluster join command. This would delay the initial step for at least one Round Trip Time (RTT), but in certain embodiments, the tenant device may be cautious and provide an access token only after the resource inquiry is accepted by the renter device. In certain embodiments, the content of the cluster join command message could be embedded in other messages from a tenant device to a renter device, instead of sending a separate cluster join command message to reduce the joining process time.

In certain configurations, an orchestration cluster join message is a unicast message from a renter device to a tenant device. Specifically, the orchestration cluster join message includes the cluster join command received from the tenant device, and the cluster join command must be received from the tenant device (either via a resource inquiry message or via a cluster join command message). In certain embodiments, it is also possible that the cluster join command may be embedded in another field of another message sent from the tenant device. In certain embodiments, if the cluster join command string or token was not received, the renter device may choose to send an empty orchestration cluster join message (i.e., an orchestration cluster join message with an empty join command) to the tenant device, requesting a cluster join command or an access token.

In certain embodiments, if a device wants to join an orchestration cluster to share its compute resources with other devices, it must join the target cluster as a worker node. The join process can be done in different ways, depending on the DDCF placement in the protocol stack. In one embodiment, if the DDCF is placed just above the data link layer (i.e., a layer 2 or L2) and below the IP layer (i.e., the network layer, which is a layer 3 or L3), the orchestration cluster join message may be used to carry the "join command". In an alternative embodiment, if the DDCF is placed above the IP layer, it is possible for the orchestrator agent (i.e., the DCO) of the renter device to directly send a join command to the orchestrator agent (i.e., the DCO) of the tenant device without any device cloud packet encapsulation, because the IP layer connectivity is already established.

Figure 13:
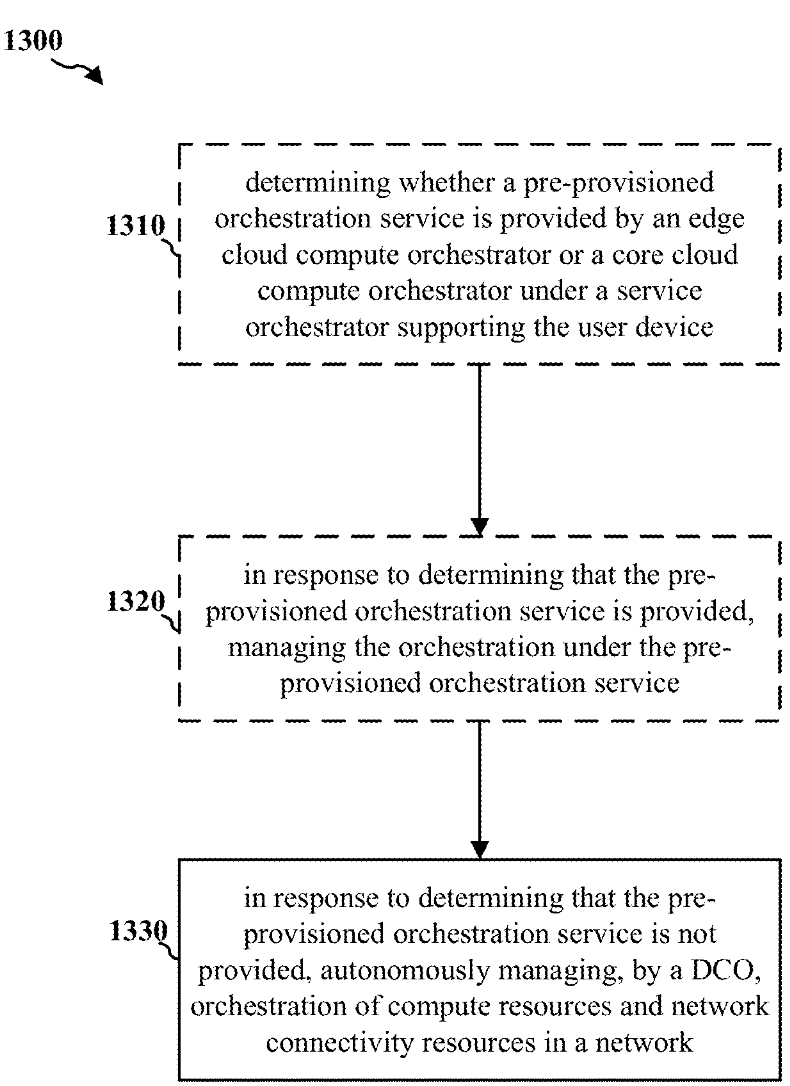
FIG. 13 is a flow chart of a method (process) for wireless communication of a device.

FIG. 13 is a flow chart of a method (process) for wireless communication of a device. The method may be performed by a device (e.g., the user device 710, and/or the user devices D1 to D11 and the network node D14), which may be a user device or a network node in a network. At operation 1310, optionally, the device determines whether a pre-provisioned orchestration service is provided by an edge cloud compute orchestrator or a core cloud compute orchestrator under a service orchestrator supporting the user device. At operation 1320, in response to determining that the pre-provisioned orchestration service is provided, the device manages the orchestration under the pre-provisioned orchestration service. On the other hand, in response to determining that the pre-provisioned orchestration service is not provided, at operation 1330, the user device autonomously manages, by a DCO, orchestration of compute resources and network connectivity resources in a network. The device is capable of creating a first cluster for an application executed on the user device and functioning as a master node and a worker node in the first cluster, and joining a second cluster for another application executed on another user device and functioning as a worker node in the second cluster for sharing compute resources and network connectivity resources of the device in the second cluster.

Figure 14:
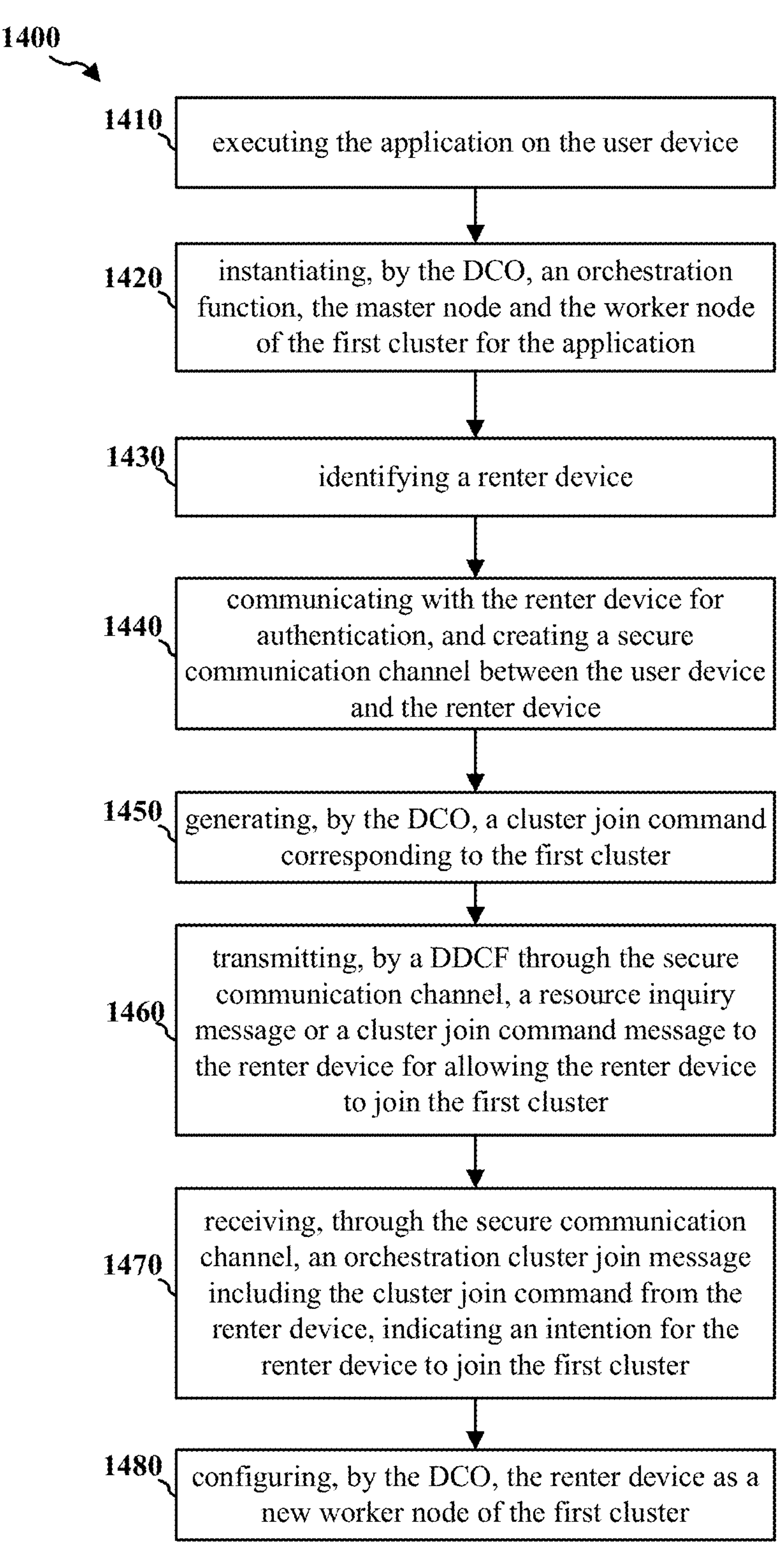
FIG. 14 is a flow chart of a method (process) for wireless communication of a tenant device.

FIG. 14 is a flow chart of a method (process) for wireless communication of a tenant device. The method may be performed by a user device (e.g., the user device 710 or the user devices D1 to D11) as a tenant device. At operation 1410, the user device executing the application on the user device. At operation 1420, the user device instantiates, by the DCO, an orchestration function, the master node and the worker node of the first cluster for the application. At operation 1430, the user device identifies a renter device. At operation 1440, the user device communicates with the renter device for authentication, and creates a secure communication channel between the user device and the renter device. At operation 1450, the user device generates, by the DCO, a cluster join command corresponding to the first cluster. At operation 1460, the user device transmits, by a DDCF through the secure communication channel, a resource inquiry message or a cluster join command message to the renter device for allowing the renter device to join the first cluster. At operation 1470, the user device receives, through the secure communication channel, an orchestration cluster join message including the cluster join command from the renter device, indicating an intention for the renter device to join the first cluster. At operation 1480, the user device configures, by the DCO, the renter device as a new worker node of the first cluster.

In certain embodiments, images of microservices of the application are stored in the user device. In one embodiment, the user device dynamically deploys, by the DCO, the microservices of the application according to a device orchestration capability. In one embodiment, the application includes a service profile for the application and the microservices for identifying the compute resources and the network connectivity resources to be shared in the network. Alternatively, in certain embodiments, the images of the microservices of the application may be stored in other devices, such as remote repositories.

In certain embodiments, in response to being unable to run the orchestration function on the user device executing the application due to inadequate computing power or to conserve battery, the user device selects a suitable device in the cluster to provide the orchestration function. The suitable device is selected based on election criteria including an amount of compute resource availability on the devices in the cluster, priority of a device type, and pre-provisioning information or configuration of the devices in the cluster. In one embodiment, the suitable device is selected by: selecting a plurality of candidate devices in the cluster, and electing an active orchestrator device of the candidate devices as the suitable device. Others of the candidate devices function as standby orchestrator devices. In one embodiment, in response to the active orchestrator device being unable to provide the orchestration function, the user device elects one of the standby orchestrator devices as a new active orchestrator device.

In certain embodiments, in response to an instruction from the renter device indicating network layer connectivity, the user device establishes a network layer communication channel between the renter device and the user device. The user device receives, by the DCO, the cluster join command from the renter device through the network layer communication channel, indicating an intention for the renter device to join the first cluster. The user device configures, by the DCO, the renter device as a new worker node of the first cluster.

In certain embodiments, the user device receives, through the secure communication channel, an orchestration cluster join message with an empty join command from the renter device, indicating an intention for the renter device to join the first cluster. The user device generates, by the DCO, a cluster join command corresponding to the first cluster. The user device transmits, by a DDCF through the secure communication channel, a cluster join command message including the cluster join command to the renter device for allowing the renter device to join the first cluster.

Figure 15:
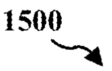
FIG. 15 is a flow chart of a method (process) for wireless communication of a renter device.
Figure 15:
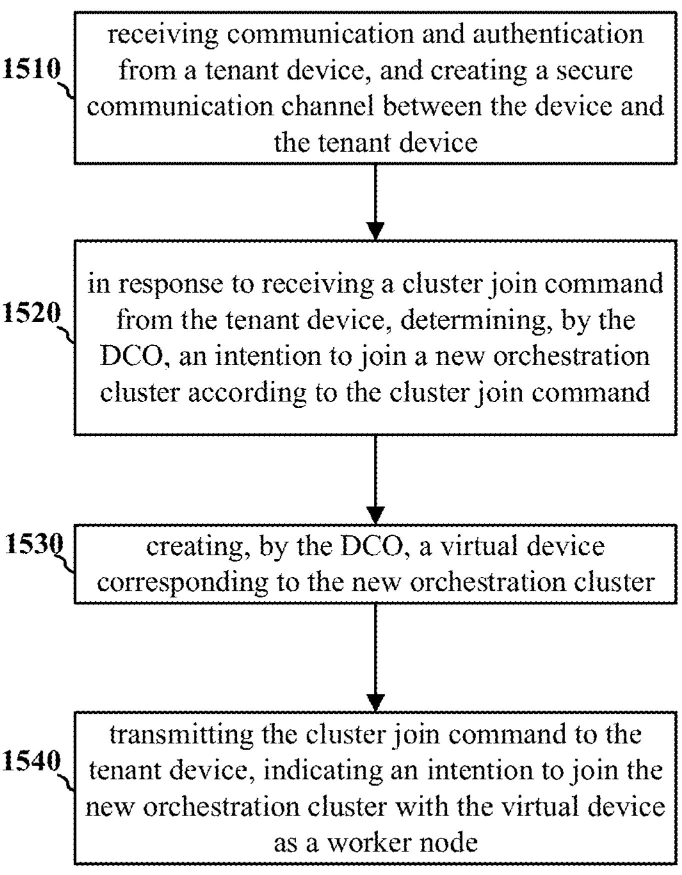

FIG. 15 is a flow chart of a method (process) for wireless communication of a renter device. The method may be performed by a user device (e.g., the user device 710 or the user devices D10 and D11) or a network node in a network (e.g., the network node D14). At operation 1510, the device receives communication and authentication from a tenant device, and creating a secure communication channel between the device and the tenant device. At operation 1520, in response to receiving a cluster join command from the tenant device, the device determines, by the DCO, an intention to join a new orchestration cluster according to the cluster join command. At operation 1530, the device creates, by the DCO, a virtual device corresponding to the new orchestration cluster. At operation 1540, the device transmits the cluster join command to the tenant device, indicating an intention to join the new orchestration cluster with the virtual device as a worker node.

In certain embodiments, the virtual device is a namespace, a container or any form of isolation.

In certain embodiments, the device instantiates a workload prediction model for estimating communication and compute resources demand (CPU load, memory usage, processing time duration) over a time-interval, and optimize the resource usage) for joining the new orchestration cluster.

In certain embodiments, the device receives, by a DDCF through the secure communication channel, a resource inquiry message or a cluster join command message from the tenant device for allowing the device to join the new orchestration cluster. The resource inquiry message or the cluster join command message includes the cluster join command.

In one embodiment, the device further determines, by the DCO, an intention to join a new orchestration cluster according to the cluster join command. The device transmits, by the DDCF through the secure communication channel, an orchestration cluster join message including the cluster join command, indicating the intention to join the new orchestration cluster as a worker node.

In certain embodiments, the device determines, by the DCO, an intention to join the new orchestration cluster without receiving the cluster join command. The device transmits, by a DDCF through the secure communication channel, an orchestration cluster join message with an empty join command, indicating the intention to join the new orchestration cluster. The device receives, by the DDCF through the secure communication channel, a cluster join command message including the cluster join command from the tenant device for allowing the device to join the new orchestration cluster.

In certain embodiments, the device establishes a network layer communication channel between the device and the tenant device. The device transmits, by the DCO, the cluster join command to the tenant device through the network layer communication channel, indicating the intention for the user device to join the new orchestration cluster.

In certain embodiments, the device is capable of joining a plurality of orchestration clusters for applications respectively executed on a plurality of tenant devices, and the DCO is configured to create a separate virtual device for each orchestration cluster to isolate each orchestration cluster from other orchestration clusters.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a device, comprising:

autonomously managing, by a device compute orchestrator (DCO), orchestration of compute resources and network connectivity resources in a network, wherein the device is capable of creating a first cluster for an application executed on a user device and functioning as a master node and a worker node in the first cluster, and joining a second cluster for another application executed on another user device and functioning as a worker node in the second cluster for sharing compute resources and network connectivity resources of the device in the second cluster;

determining whether a pre-provisioned orchestration service is provided by an edge cloud compute orchestrator or a core cloud compute orchestrator under a service orchestrator supporting the user device; and in response to determining that the pre-provisioned orchestration service is provided, managing the orchestration under the pre-provisioned orchestration service, wherein the DCO is configured to manage the orchestration in response to determining that the pre-provisioned orchestration service is not provided.

2. The method of claim 1, wherein the device is a user device, and the method further comprises:

executing the application on the user device; and instantiating, by the DCO, an orchestration function, the master node and the worker node of the first cluster for the application.

3. The method of claim 2, wherein images of microservices of the application are stored in the user device.

4. The method of claim 3, further comprising:

dynamically deploying, by the DCO, the microservices of the application according to a device orchestration capability.

5. The method of claim 3, wherein the application includes a service profile for the application and the microservices for identifying the compute resources and the network connectivity resources to be shared in the network.

6. The method of claim 2, wherein images of microservices of the application are stored in other devices or remote repositories.

7. The method of claim 2, further comprising:

in response to being unable to run the orchestration function on the user device executing the application due to inadequate computing power or to conserve battery, selecting a suitable device in the cluster to provide the orchestration function, wherein the suitable device is selected based on election criteria including an amount of compute resource availability on the devices in the cluster, priority of a device type, and pre-provisioning information or configuration of the devices in the cluster.

8. The method of claim 7, wherein the suitable device is selected by:

selecting a plurality of candidate devices in the cluster; and electing an active orchestrator device of the candidate devices as the suitable device, wherein others of the candidate devices function as standby orchestrator devices.

9. The method of claim 8, further comprising:

in response to the active orchestrator device being unable to provide the orchestration function, electing one of the standby orchestrator devices as a new active orchestrator device.

10. The method of claim 2, further comprising:

identifying a renter device, wherein the user device intends to function as a tenant device; and communicating with the renter device for authentication, and creating a secure communication channel between the user device and the renter device.

11. The method of claim 10, further comprising:

generating, by the DCO, a cluster join command corresponding to the first cluster; and transmitting, by a distributed device cloud function (DDCF) through the secure communication channel, a resource inquiry message or a cluster join command message to the renter device for allowing the renter device to join the first cluster, wherein the resource inquiry message or the cluster join command message includes the cluster join command.

12. The method of claim 11, further comprising:

receiving, through the secure communication channel, an orchestration cluster join message including the cluster join command from the renter device, indicating an intention for the renter device to join the first cluster; and configuring, by the DCO, the renter device as a new worker node of the first cluster.

13. The method of claim 11, further comprising:

in response to an instruction from the renter device indicating network layer connectivity, establishing a network layer communication channel between the renter device and the user device;

receiving, by the DCO, the cluster join command from the renter device through the network layer communication channel, indicating an intention for the renter device to join the first cluster; and configuring, by the DCO, the renter device as a new worker node of the first cluster.

14. The method of claim 10, further comprising:

receiving, through the secure communication channel, an orchestration cluster join message with an empty join command from the renter device, indicating an intention for the renter device to join the first cluster;

generating, by the DCO, a cluster join command corresponding to the first cluster; and transmitting, by a distributed device cloud function (DDCF) through the secure communication channel, a cluster join command message including the cluster join command to the renter device for allowing the renter device to join the first cluster.

15. The method of claim 1, wherein the device is a user device or a network node, and the method further comprises:

receiving communication and authentication from a tenant device, and creating a secure communication channel between the device and the tenant device;

in response to receiving a cluster join command from the tenant device, determining, by the DCO, an intention to join a new orchestration cluster according to the cluster join command, wherein the device functions as a renter device;

creating, by the DCO, a virtual device corresponding to the new orchestration cluster; and transmitting the cluster join command to the tenant device, indicating an intention to join the new orchestration cluster with the virtual device as a worker node.

16. The method of claim 15, wherein the virtual device is a namespace, a container or any form of isolation.

17. The method of claim 15, further comprising:

instantiating a workload prediction model for estimating communication and compute resources demand (CPU load, memory usage, processing time duration) over a time-interval, and optimize the resource usage) for joining the new orchestration cluster.

18. The method of claim 15, further comprising:

receiving, by a distributed device cloud function (DDCF) through the secure communication channel, a resource inquiry message or a cluster join command message from the tenant device for allowing the device to join the new orchestration cluster, wherein the resource inquiry message or the cluster join command message includes the cluster join command.

19. The method of claim 18, further comprising:

determining, by the DCO, an intention to join a new orchestration cluster according to the cluster join command; and transmitting, by the DDCF through the secure communication channel, an orchestration cluster join message including the cluster join command, indicating the intention to join the new orchestration cluster as a worker node.

20. The method of claim 15, further comprising:

determining, by the DCO, an intention to join the new orchestration cluster without receiving the cluster join command;

transmitting, by a distributed device cloud function (DDCF) through the secure communication channel, an orchestration cluster join message with an empty join command, indicating the intention to join the new orchestration cluster; and receiving, by the DDCF through the secure communication channel, a cluster join command message including the cluster join command from the tenant device for allowing the device to join the new orchestration cluster.

21. The method of claim 15, further comprising:

establishing a network layer communication channel between the device and the tenant device; and transmitting, by the DCO, the cluster join command to the tenant device through the network layer communication channel, indicating the intention for the user device to join the new orchestration cluster.

22. The method of claim 15, wherein the device is capable of joining a plurality of orchestration clusters for applications respectively executed on a plurality of tenant devices, and the DCO is configured to create a separate virtual device for each orchestration cluster to isolate each orchestration cluster from other orchestration clusters.

23. The method of claim 1, further comprising:

generating, by a distributed device cloud function (DDCF), a device cloud packet data unit (PDU) including a device cloud protocol header and one or more device cloud messages, wherein each device cloud message includes a device cloud message header and a device cloud message payload, and a content in the device cloud message payload of each device cloud message is determined, based on a value of a message type field in the device cloud message header, as a resource inquiry message, a cluster join command message, or an orchestration cluster join message.

24. An apparatus for wireless communication, the apparatus being a device, comprising:

a memory; and at least one processor coupled to the memory and configured to:

autonomously manage, by a device compute orchestrator (DCO), orchestration of compute resources and network connectivity resources in a network, wherein the device is capable of creating a first cluster for an application executed on a user device and functioning as a master node and a worker node in the first cluster, and joining a second cluster for another application executed on another user device and functioning as a worker node in the second cluster for sharing compute resources and network connectivity resources of the device in the second cluster;

determine whether a pre-provisioned orchestration service is provided by an edge cloud compute orchestrator or a core cloud compute orchestrator under a service orchestrator supporting the user device; and in response to determining that the pre-provisioned orchestration service is provided, manage the orchestration under the pre-provisioned orchestration service, wherein the DCO is configured to manage the orchestration in response to determining that the pre-provisioned orchestration service is not provided.

25. The apparatus of claim 24, wherein the device is a user device, and the processor is further configured to:

execute the application on the user device; and instantiate, by the DCO, an orchestration function, the master node and the worker node of the first cluster for the application.

26. The apparatus of claim 25, wherein the processor is further configured to:

identify a renter device, wherein the user device intends to function as a tenant device; and communicate with the renter device for authentication, and creating a secure communication channel between the user device and the renter device.

27. The apparatus of claim 26, wherein the processor is further configured to:

generate, by the DCO, a cluster join command corresponding to the first cluster; and transmit, by a distributed device cloud function (DDCF) through the secure communication channel, a resource inquiry message or a cluster join command message to the renter device for allowing the renter device to join the first cluster, wherein the resource inquiry message or the cluster join command message includes the cluster join command.

28. The apparatus of claim 27, wherein the processor is further configured to:

receive, through the secure communication channel, an orchestration cluster join message including the cluster join command from the renter device, indicating an intention for the renter device to join the first cluster; and configure, by the DCO, the renter device as a new worker node of the first cluster.

29. The apparatus of claim 24, wherein the device is a user device or a network node, and the processor is further configured to:

receive communication and authentication from a tenant device, and creating a secure communication channel between the device and the tenant device;

in response to receiving a cluster join command from the tenant device, determine, by the DCO, an intention to join a new orchestration cluster according to the cluster join command, wherein the device functions as a renter device;

create, by the DCO, a virtual device corresponding to the new orchestration cluster; and transmit the cluster join command to the tenant device, indicating an intention to join the new orchestration cluster with the virtual device as a worker node.

* * * * *